United States Patent [19]
Cesarano, III et al.

[11] Patent Number: 6,027,326
[45] Date of Patent: Feb. 22, 2000

[54] FREEFORMING OBJECTS WITH LOW-BINDER SLURRY

[75] Inventors: Joseph Cesarano, III, Albuquerque, N.Mex.; Paul D. Calvert, Tucson, Ariz.

[73] Assignee: Sandia Corporation, Albuquerque, N.Mex.

[21] Appl. No.: 08/958,973

[22] Filed: Oct. 28, 1997

[51] Int. Cl.[7] .................................................. B29C 25/08
[52] U.S. Cl. .......................... 425/375; 264/113; 264/308; 264/401; 264/497; 264/669; 425/449; 425/453
[58] Field of Search ..................................... 264/113, 308, 264/401, 497, 669; 425/375, 449, 453

[56] References Cited

U.S. PATENT DOCUMENTS

| | | | |
|---|---|---|---|
| 3,366,498 | 1/1968 | Osborne | 264/669 |
| 4,323,756 | 4/1982 | Brown et al. | 219/121 |
| 4,724,299 | 2/1988 | Hammeke | 219/121 |
| 5,208,431 | 5/1993 | Uchiyama et al. | 219/121.65 |
| 5,301,415 | 4/1994 | Prinz et al. | 29/458 |
| 5,301,863 | 4/1994 | Prinz et al. | 228/33 |
| 5,370,692 | 12/1994 | Fink et al. | 623/16 |
| 5,398,193 | 3/1995 | deAngelis | 364/468 |
| 5,510,066 | 4/1996 | Fink et al. | 264/401 |
| 5,578,227 | 11/1996 | Rabinovich | 219/121.63 |
| 5,617,911 | 4/1997 | Sterett et al. | 164/457 |
| 5,622,216 | 4/1997 | Brown | 164/71.1 |
| 5,648,450 | 7/1997 | Dickens, Jr. et al. | 528/323 |
| 5,697,043 | 12/1997 | Baskaran et al. | 264/308 |

*Primary Examiner*—Jan H. Silbaugh
*Assistant Examiner*—Dae Young Lee
*Attorney, Agent, or Firm*—George H. Libman

[57] ABSTRACT

In a rapid prototyping system, a part is formed by depositing a bead of slurry that has a sufficient high concentration of particles to be pseudoplastic and almost no organic binders. After deposition the bead is heated to drive off sufficient liquid to cause the bead to become dilatant.

8 Claims, 5 Drawing Sheets

FREEFORMING OBJECTS WITH LOW-BINDER SLURRY

The United States Government has rights in this invention pursuant to Department of Energy Contract No. DE-AC04–94AL85000 with Sandia Corporation.

BACKGROUND OF THE INVENTION

Rapid prototyping systems are now under development in an attempt to provide single automated systems which can produce prototypes and small production runs directly from engineering drawings. There are currently several types of such systems, some of which types are described in the background section of U.S. Pat. No. 5,398,193 of deAngelis, which section is incorporated herein by reference thereto.

As discussed in the referenced patent, the typical system includes a source of material, a material deposition system such as a nozzle, a material receiving platform, and means for moving the platform in at least three directions with respect to the deposition system under the control of a computer. The material typically flows through the nozzle as either a powder or a liquid and is hardened by some process when it hits the platform or a previous hardened layer of material. Objects are formed by spraying and hardening successive slices of the final object.

For systems based on depositing a colloidal slurry, the ideal system would permit a rapid flow of material from the nozzle and even distribution of material, with rapid solidification, when the material strikes a surface. Furthermore, as multiple layers are applied, they must flow together sufficiently to form a unitary structure, but not flow so much as to distort the shape of the structure. Lastly, the deposited structure should be relatively quickly hardened to a final form that is free of voids.

Typical slurry systems known in the art rely on photopolymerizable, thermoplastic, acrylate, or epoxy additives that cause the slurry to transform into a rigid mass after the slurry has been dispensed from an orifice. These additives comprise from 40 to 70% of the volume of the deposited slurry, resulting in either a significant change in volume or significant voids in the structure after the additives are removed prior to sintering. Furthermore, to prevent cracking, these non-volatile organic additives must be removed very slowly. This process typically involves heating the samples carefully for several days to burn off the additives.

SUMMARY OF THE INVENTION

It is an object of this invention to provide a slurry for rapid prototyping with less than 10% volume, and preferably less than 0.5% volume, of organic binders.

It is a further object of this invention to provide a slurry for rapid prototyping which has a sufficient volume of solids to be pseudoplastic, and less than 10% volume organic binders.

Additional objects, advantages, and novel features of the invention will become apparent to those skilled in the art upon examination of the following description or may be learned by practice of the invention. The objects and advantages of the invention may be realized and attained as particularly pointed out in the appended claims.

To achieve the foregoing and other objects, and in accordance with the purpose of the present invention, as embodied and broadly described herein, the present invention may comprise a rapid prototyping system for forming parts of a predetermined material by depositing a bead of slurry onto a surface, the surface moving in a predetermined pattern with respect to the bead, and the slurry consisting of a mixture of a volatile solvent; particles of the predetermined material which are insoluble in the solvent, and a small amount of non-volatile organic binder and/or dispersant. The volume percentage of particles in the liquid is sufficiently high that the slurry is pseudoplastic. Although it still is capable of flow through a nozzle, it becomes hard upon deposition and rapid partial drying of the volatile solvent, which causes the volume percentage of particles to increase and the material to be dilatant.

BRIEF DESCRIPTION OF THE DRAWINGS

The accompanying drawings, which are incorporated in and form part of the specification, illustrate an embodiment of the present invention and, together with the description, serve to explain the principles of the invention.

FIG. 6a shows a partially completed hollow cone being built according to the invention.

FIG. 6b shows the completed cone of FIG. 6a.

DETAILED DESCRIPTION OF THE INVENTION

Figure 1:
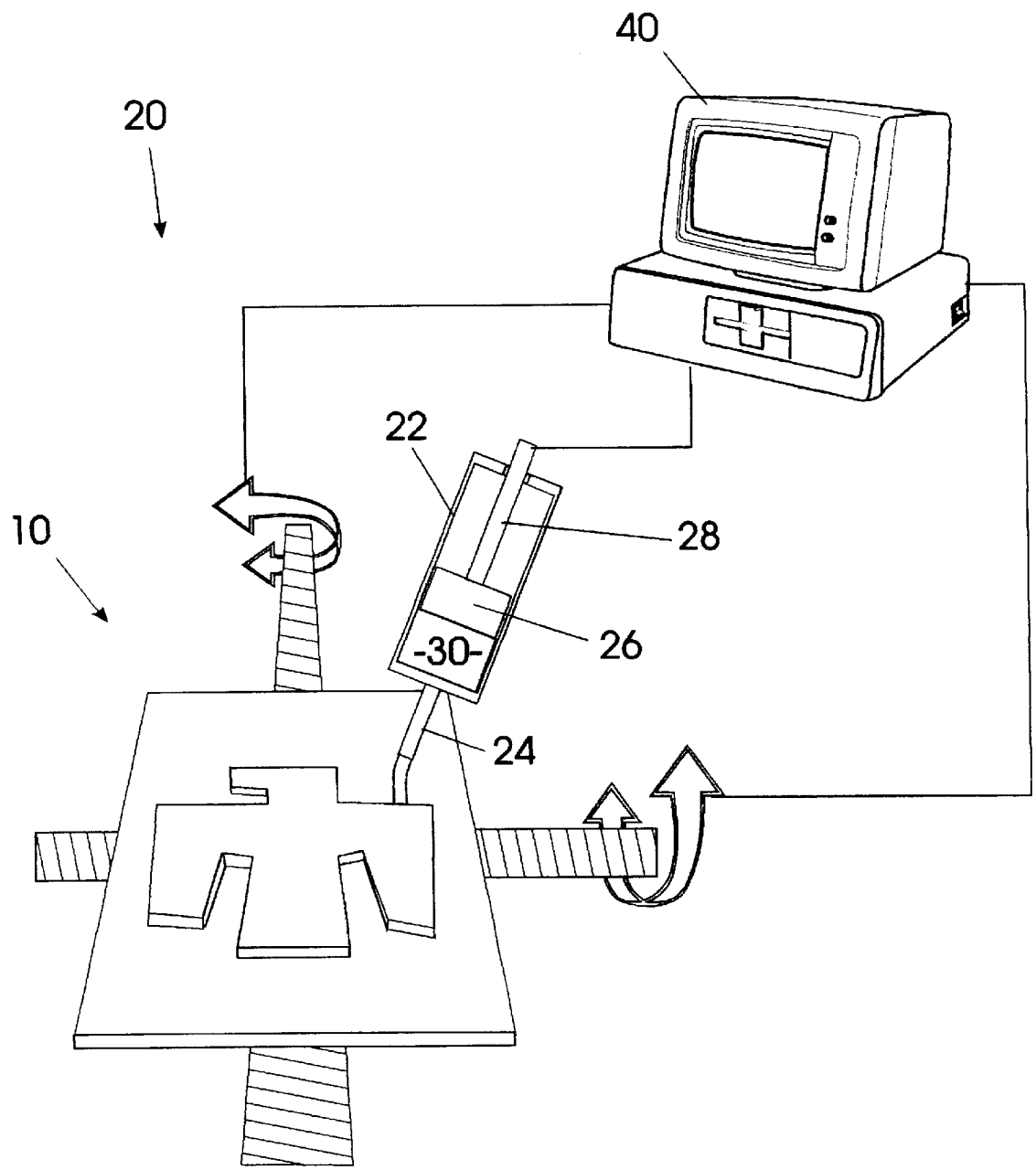
FIG. 1 shows a schematic representation of hardware for practice of this invention.

As shown in FIG. 1, in accordance with a preferred embodiment of this invention, a system for freeforming a sample includes a moveable platform 10 and a material depositing device 20 having a nozzle 24 through which material 30 is controllably deposited. Conventional means are provided for controllably moving depositing device 20 with respect to platform 10 in at least X, Y, and Z directions. As illustrated, platform 10 may be an X-Y table which is moveable in the X-Y plane, and device 20 may be driven by conventional means such as a threaded rod in the Z direction. Alternatively, platform 10 may be fixed and device 20 may be affixed to a robotic arm moveable in any direction. In addition, both platform 10 and device 20 may be moveable with respect to one another. Such structures are well known in the art, and their details do not form part of this invention.

Depositing device 20 may be a syringe having a hollow cylindrical body 22 enclosing a piston 26 which moves along the axis of cylinder 22 under the control of actuator 28. Such devices are also well known in the art, and their details do not form part of this invention.

The movement of device 20 with respect to platform 10, and the movement of piston 26 within cylinder 22, is controlled by a programmed computer 40. There are many examples of computers programmed for such operations in the literature, and the details of the control system does not form a part of this invention.

Figure 2:
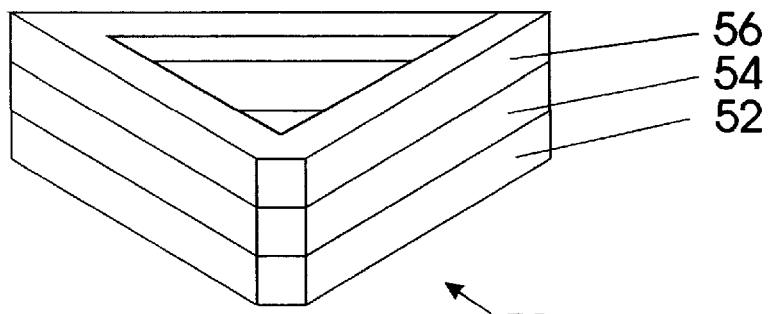
FIG. 2 shows a part built according to this invention.

A typical part 50 that may be constructed using the invention is shown in FIG. 2 to include a plurality of layers 52, 54, 56, etc. of material deposited from device 20 as it moves relative to surface 10 in the desired pattern. Part 50 is a section of a triangular tube formed by depositing a single bead 52 of material 30 from nozzle 24 while device 20 moves in a triangular pattern. By exactly repeating the X-Y pattern while moving nozzle 24 in the Z direction a distance equal to the thickness of each layer, subsequent layers 54 and 56 are deposited directly on top of the previous layers, thereby forming the walls of a triangular tube.

Although the prior art shows many examples of systems similar to the structure discussed above, this invention recognizes that there are several critical issues regarding the material and its rate of deposition that must be addressed in order to get a finished part that is void-free, crack-free, of uniform density and of uniform cross section. In particular, according to this invention, the material, rate of flow, nozzle size, and drying rate must be carefully selected to provide a slurry that flows through the nozzle orifice easily upon shear and has a high yield stress upon deposition.

The slurry viscosity must be tailored during processing for optimal performance. Additionally, the Theological dependence of viscosity with shear rate must be controlled. During dispensing, the slurry will experience high shear conditions while flowing through the orifice and as the moving substrate interacts with the dispensing slurry. However, immediately following this process (when it is clear of the nozzle), the slurry experiences a shear rate near zero. Therefore, in order to control the shape of dispensed beads, the slurry rheology must be extremely pseudoplastic so that the material can flow smoothly during dispensing but then solidify in place once shear stresses are removed (similar to paint). If the slurry is too fluid, beads will spread uncontrollably. If the slurry is too viscous, beads lay down like rope and maintain rounded tops. When the proper rheology is obtained, beads yield nearly rectangular cross sections with relatively straight walls and flattened tops, as illustrated by bead 32 in FIG. 3. Perfectly, rectangular cross sections would be optimal for filling space when additional layers are sequentially dispensed.

In addition to viscosity and rheology, the initial dimensions of the dispensed beads (prior to drying) are largely determined by the rate at which the slurry is dispensed. The initial size of the bead is determined by the volumetric rate of dispensing (ml/s) and the travel speed of the X-Y table 10 (mm/s). For a given volumetric dispensing rate, the bead dimensions will be thick if the table speed is slow. If the table speed is fast then the bead will be stretched and the dimensions will be thin. These are very important parameters when considering the fabrication of an actual part. Bead dimensions will determine the optimum Z-axis increments for subsequent layer deposition and the optimum X-Y axes increments for filling in solid regions within a component.

Figure 4:
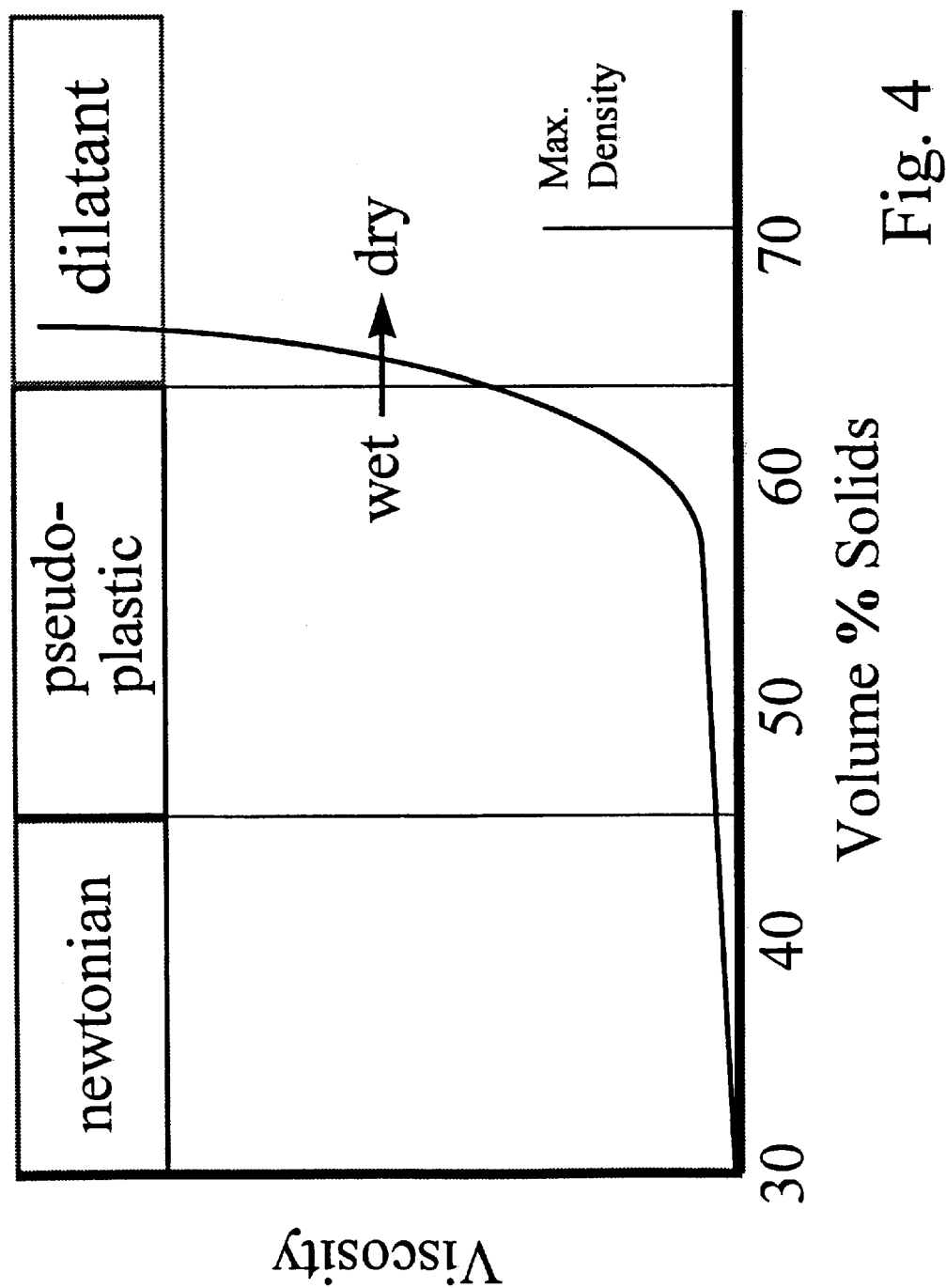
FIG. 4 shows the rheology of a slurry according to this invention.

A critical part of this invention is to have the proper percentage of solid particles in the slurry. The solids content affects the viscosity and rheology of the slurry and the final bead dimensions. FIG. 4 shows the viscosity of a slurry formed from variable amounts of ceramic powder and water, and a small amount of dispersant to keep the particles from sticking to one another. A dispersed slurry with a low percentage of solids exhibits Newtonian flow where the particles have relatively little interaction as they move freely within a relatively great volume of solvent. As the percentage of solids increases, the frequency of interactions between particles increases, and the viscosity begins to increase rapidly as the slurry becomes pseudoplastic. As the percentage of solids continues to increase, the particles become more closely packed together and particle movement becomes restricted. There is a maximum packing density of particles which is a function of size, shape, and distribution of the particles. As fluid is removed from the slurry, the viscosity increases asymptotically as the percentage of solids nears that value. At a percentage of solids which may be determined experimentally for each dispersed slurry, the slurry will retain its shape after it is deposited through a nozzle. The slurry now exhibits dilatant flow, which in the terms of this invention means that the dispersed bead does not flow.

In accordance with this invention, the slurry must be in the range of the pseudoplastic increase for use in rapid prototyping, for at this range it is fluid enough to be dispersed through a nozzle, but not so fluid as to loose its shape upon contact with surface 10 or previous layers of part 50. Furthermore, if the deposited viscosity is correctly chosen, the deposited bead will slump slightly to flatten its top and straighten its sides, which is the ideal cross section for bead meshing and interlayering.

The dilatant state is reached by partially drying the pseudoplastic flow from nozzle 24 upon reaching its resting location. Heating may be used to drive volatile liquid from the slurry, increasing the volume percent of solids and the viscosity of the deposited bead. Surface 10 may be heated for fluid deposited thereon; auxiliary heaters may be utilized to transform successive layers of a part 50 from pseudoplastic to dilatant status.

Figure 5:
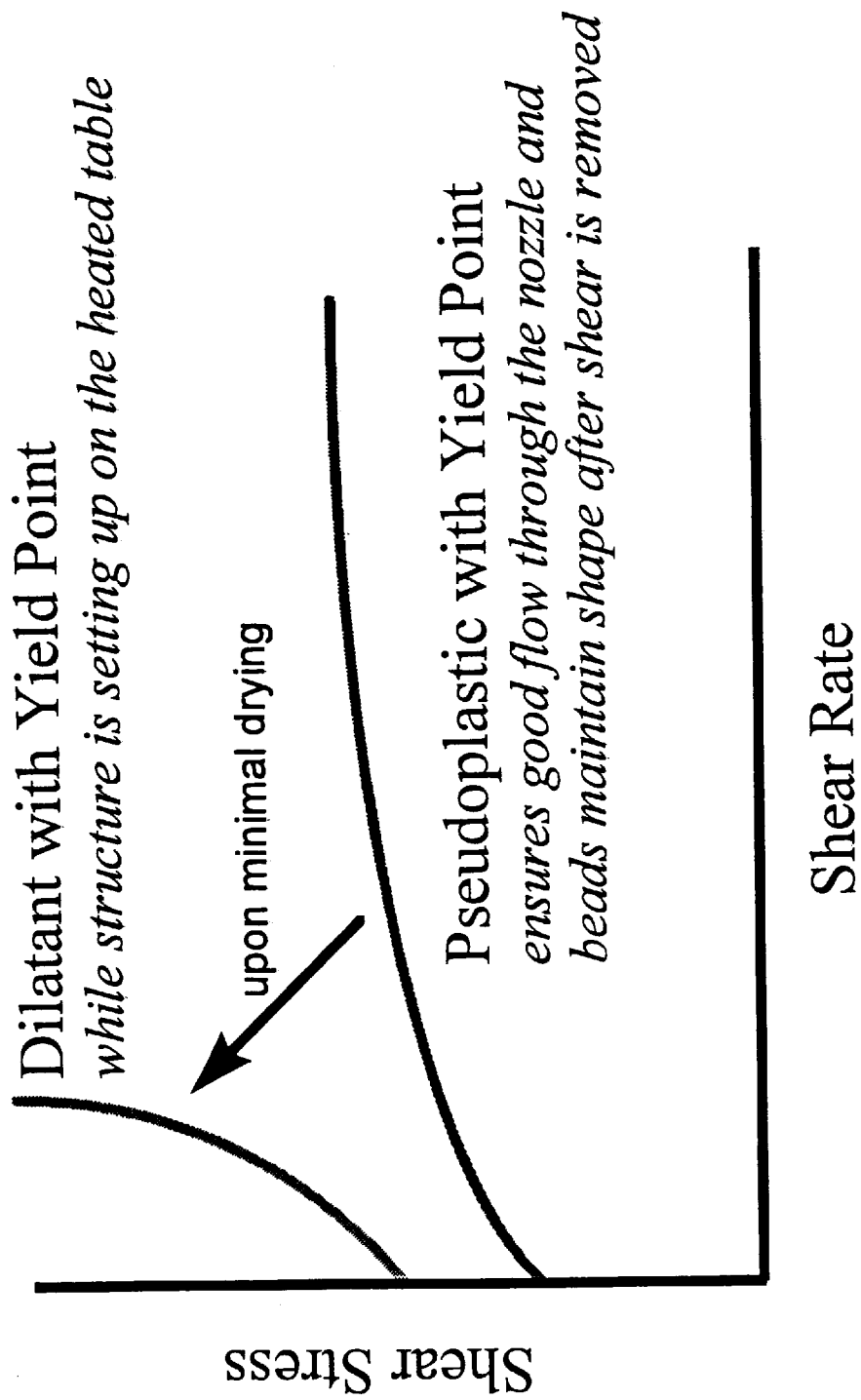
FIG. 5 shows pseudoplastic to dilatant transition for the slurry of the invention.

FIG. 5 shows the change in shear stress (the applied load to a fluid divided by surface area of a unit length of the container) as a function of shear rate (the average velocity of the fluid relative to the container wall) for pseudoplastic and dilatant materials. The slope of these curves is the viscosity of the fluid. Pseudoplastic fluids are seen to exhibit concave curves with a portion having relatively constant shear stress as a function of shear rate. These fluids, once flowing, have a low viscosity and are able to maintain good flow through the nozzle. Once the pseudoplastic flow has been delivered and heated the resulting bead change to a dilatant state. The convex curve in FIG. 5 shows that the viscosity goes off the chart as the material hardens and flow stops.

Achieving a high solids content has three beneficial effects. First, with a high enough solids content the slurry is on the verge of becoming dilatant. After dispensing, only a minimal amount of drying has to occur for the dispensed pseudoplastic bead to transform into an unflowable dilatant mass. This bead will not flow even if a shear stress is applied (see FIG. 5). Secondly, the amount of drying shrinkage is minimized so that final bead dimensions can be more accurately controlled. Thirdly, a high solids content yields a high pre-sintered density which means less sintering shrinkage and better control of final near-net-shape tolerance.

Controlled drying kinetics of the dispensed bead and the time between subsequent layer deposition are also important for the minimization of cracking, warping, and defects due to delamination. Under optimal drying conditions the moisture content of a previously deposited bead is low enough to induce the permeation of fluid into its structure from a wet, freshly dispensed bead. The fluid transport naturally drags some powder particles with it and creates a finite interpenetrated region between the two beads that is free of defects or delaminations. If the drying rate is too fast, warping, cracking, and delamination may occur. When the drying rate is too slow, the built up weight from several layers can induce slumping and the creation of nonuniform walls.

As the following example shows, once the teaching of the invention is clear, application is a matter of routine experimentation for any particular powder:

The objective was to make objects utilizing a moving horizontal table under a vertical syringe containing an aqueous slurry of A-15 alumina that contained from 58–61 volume percent alumina; about 0.2% Darvan 821A dispersant; and water. The alumina particles had an average diameter of 2.2 µm and an average surface area of 4.3 m²/g, although the distribution of particles ranged in size from 10 µm to very small. The slurry was well mixed (gently ball milled for more than one week) and was very pseudoplastic: it had a viscosity of~1M cP at 0.07 s$^{-1}$ shear rate, and a viscosity of 40K–70K at 1.7 s$^{-1}$ shear rate. At the higher dispersal speed of approximately 20 s$^{-1}$, the viscosity of this slurry was even lower.

A bead of slurry at room temperature was deposited in a normal atmosphere onto a 40–60° C. platform moving at 5–12 mm/sec relative to the nozzle. The extrusion rate was from 0.0065–0.01 mL/sec. The heated platform provided sufficient evaporation of the volatile water to change the slurry to the dilatant stage, where the part was solid but not dry.

After several beads were deposited and a part fabricated, the part was completely dried in an oven at 90° C. to evaporate any remaining water. The green density in this state was found to be routinely greater than 63%. This is relatively close to the measured maximum packing density for the powder used (approximately 70%). Following drying, the part was heated at a rate of 3° C./min to 600° C. to remove volatile material such as binder and solvent by thermal decomposition. It was then sintered, in a manner well known in the ceramic art, by heating at 10° C./min to 1600, where it was held for two hours. The final sintered density was found to be routinely greater than 95%.

One key to the invention is the near absence of nonvolatile organic binders in this process. Such binders, although conventional in prior art systems, may create defects in the resulting structure unless they are carefully removed by extremely long thermal decomposition procedures, which are expensive and incompatible with rapid prototyping. In the invention, such binders are preferably limited to less than about 0.5 volume percent, and are utilized only to keep the particles from clumping.

Another key is the use of a pseudoplastic slurry that has a particle density that preferably approaches to within 5–15% of the theoretical maximum packing density of the powder. There must be sufficient density of powder for the slurry to be pseudoplastic, as the invention is based on the conversion of the pseudoplastic flow to dilatant flow upon drying after contact with the surface or with previous layers of ceramic material.

Although the invention has been tested with alumina, the invention will work with any insoluble powdered material that is capable of being mixed into a pseudoplastic slurry that changes to dilatant upon deposition. For example, many ceramic and metal powders are expected to work with this invention. In addition, organic solids such as latex spheres may be utilized.

In practice, the maximum packing density for a given powder should be measurable from settling experiments. For any powder, experiments may be used to determine the slurry proportions that will pseudoplastically from the nozzle and then dry to the dilatant form upon contact with a surface.

Figure 3:
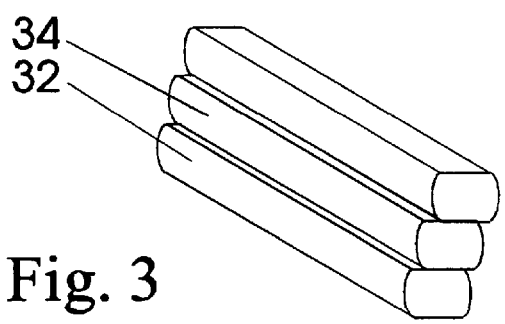
FIG. 3 shows a cross section of a deposited bead of material according to the invention.
Figures 6A, 6B:
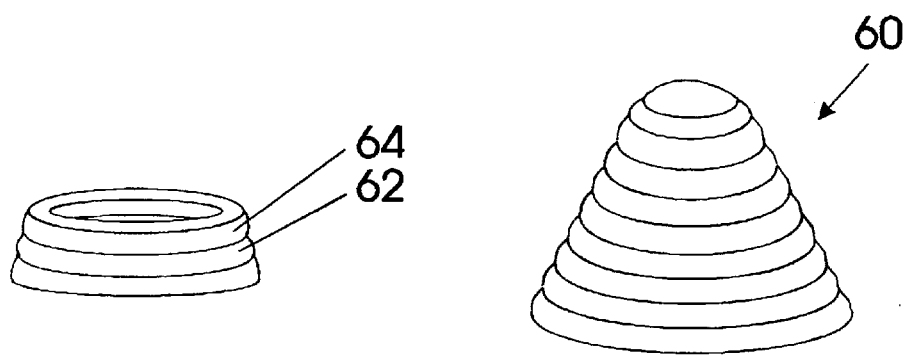

This invention can be used to make intricate ceramic bodies that sinter into relatively strong, dense and defect free parts. Using the invention, components may be fabricated into bulk solids with large thicknesses unobtainable using slip casting; or, thin walled pieces made with aspect ratios greater than 20 and wall thicknesses less than 1 mm. Furthermore, using the process described in the example, a successively deposited bead 34 may be offset slightly from previous bead 32, as shown in FIG. 3, enabling structures such as a hollow cone to be formed. As illustrated in FIG. 6a, during construction each higher level (such as 64), hollow cone 60 is made with a slightly smaller radius than the underlying layer 62. If the deposited slurry was too liquid, such a structure would collapse. The completed cone is illustrated in FIG. 6b. With minimal machining after partial or complete sintering, the sides of cone 60 may be smoothed (not illustrated).

Figure 7:
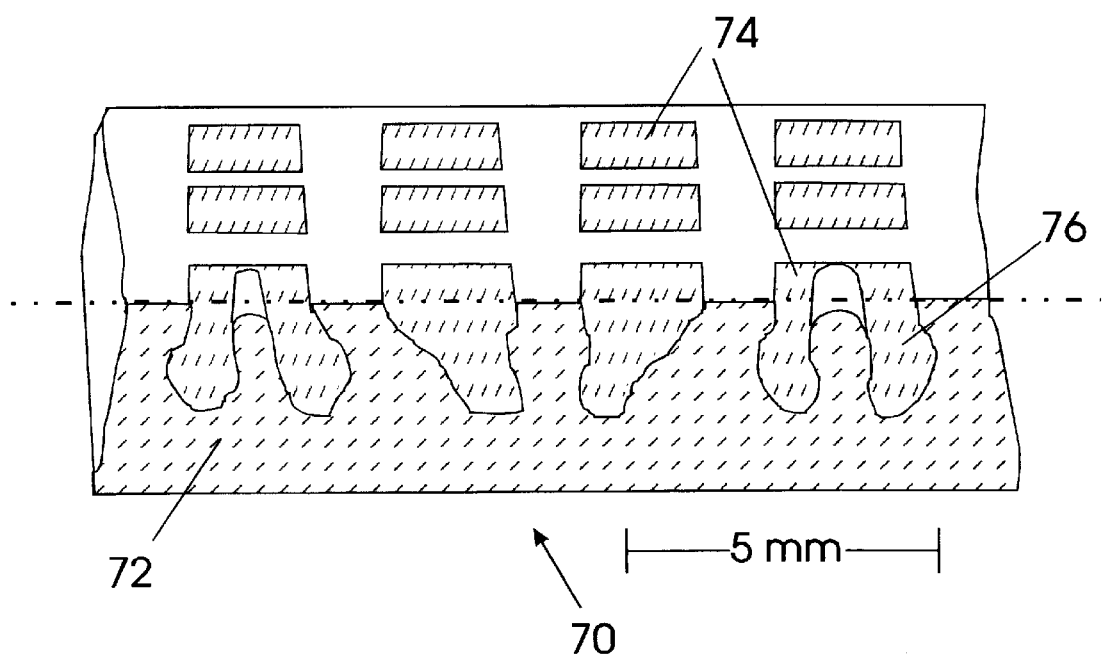
FIG. 7 shows a cross section of a multi-material part built according to the invention.

FIG. 7 shows a cross section of a part 70 that demonstrates the precision capability of the invention and the possibilities for fabricating structures that are not currently possible by traditional manufacturing methods. Part 70 was formed first as a solid block of ceramic material 72 by stacking several layers of adjacent beads of material. A pattern of openings was then formed on the part, with a typical opening 74 having undercut portions 76 into the sides of the ceramic material. These openings were filled by infiltrating molten metal, resulting in a bimaterial structure that smoothly transitions from ceramic to metal.

The particular sizes and equipment discussed above are cited merely to illustrate a particular embodiment of this invention. It is contemplated that the use of the invention may involve components having different sizes and shapes as long as the principle of utilizing a pseudoplastic slurry having very little organic binders which changes to a dilatant stage upon placement, is followed. It is intended that the scope of the invention be defined by the claims appended hereto.

We claim:

1. In a rapid prototyping system for forming parts of a predetermined material, said system including a slurry and means for depositing a bead of said slurry onto a surface, wherein said surface moves in a predetermined pattern with respect to the bead, said slurry consisting of a mixture of:

a volatile liquid;

no more than 10 volume percent nonvolatile binders and dispersants; and particles of said predetermined material, said particles being insoluble in said liquid, the volume percentage of particles in said mixture being sufficiently high that said slurry is pseudoplastic, said slurry becoming dilatant upon deposition by said system in a drying environment.

2. The system of claim 1 wherein said liquid is water.

3. The system of claim 2 wherein said material is ceramic.

4. The system of claim 3 wherein said material is alumina.

5. The system of claim 1 wherein said nonvolatile binders and dispersant comprise less than 1 volume percent of said slurry.

6. The system of claim 5 wherein said nonvolatile binders and dispersant are organic.

7. The system of claim 6 wherein said nonvolatile binders and dispersant comprise less than 0.5 volume percent of said slurry.

8. The system of claim 1 wherein said volume percentage of particles in said slurry is within 5 to 15% of the maximum packing density for said material.

* * * * *